INVENTOR.
FREDERICK F. LIU

BY R. E. Giauque

ATTORNEY

Aug. 24, 1965  F. F. LIU  3,201,988
PERFORATED DISC TYPE TURBINE FLOWMETER
Filed Nov. 2, 1962  2 Sheets-Sheet 2
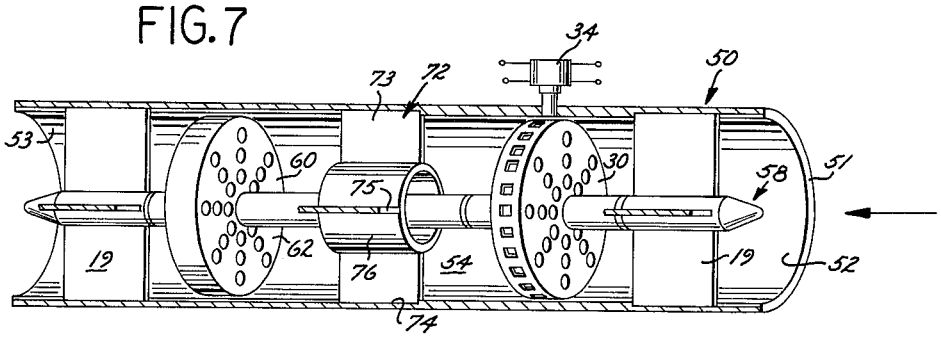
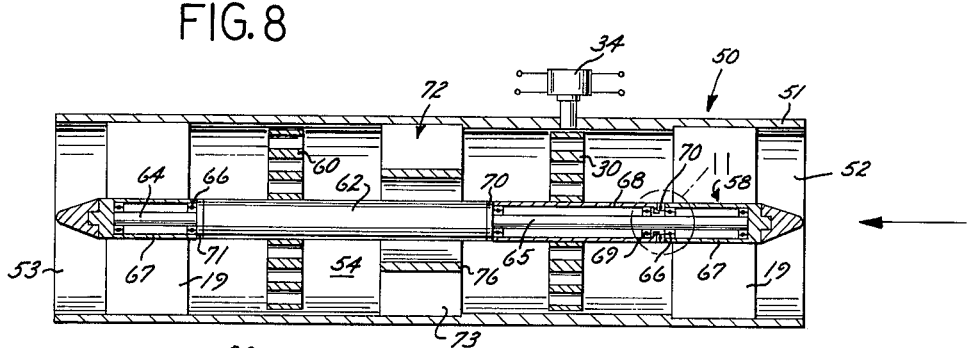
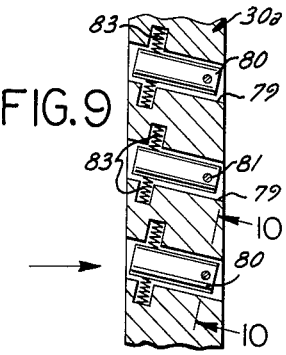
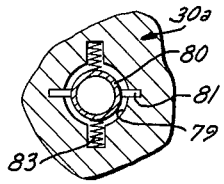
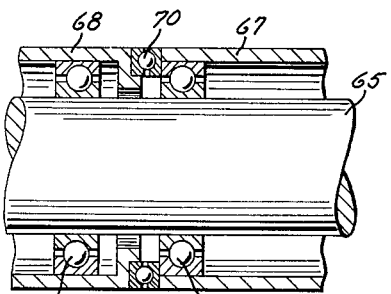
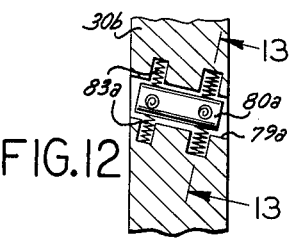
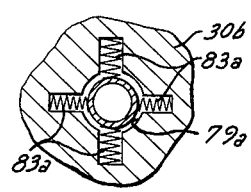
INVENTOR.
FREDERICK F. LIU
BY R. E. Georgue
ATTORNEY

United States Patent Office 3,201,988
Patented Aug. 24, 1965

3,201,988
PERFORATED DISC TYPE TURBINE FLOWMETER
Frederick F. Liu, Northridge, Calif., assignor to Quantum Dynamics, Inc., Tarzana, Calif., a corporation of California
Filed Nov. 2, 1962, Ser. No. 235,002
3 Claims. (Cl. 73—231)

This invention relates to perforated disc-type turbine rotors and more particularly to a rotor for a flowmeter which is bladeless and is in the form of a disc having orifices angularly disposed therethrough.

In conventional turbine type flowmeters employing a rotor as a sensing element, the rotor has a number of blades on the periphery and the blades are so arranged as to present a certain angle of attack from the direction of the flowing stream. Although generally satisfactory, these rotors have the drawback that the blades are subject to breakage under unfavorable conditions such as extreme temperatures, vibration and mixed gaseous and liquid flow.

In view of the foregoing factors and conditions characteristic of turbine type rotors employing blades, it is a primary object of the present invention to provide a new and improved rotor not subject to the disadvantages enumerated above and having orifices arranged on a circular disc in such a manner that fluid flowing along the axial direction and through the orifices will create a torque which causes the disc to rotate at an angular speed which is a function of the flow velocity.

Another object of the invention is to provide a volumetric flow meter employing one or more bladeless rotors.

Still another object of the invention is to provide a mass flow rate meter employing one or more bladeless rotors.

A further object of the invention is to provide a turbine type flow meter employing a rotor which has orifices arranged to provide a favorable flow distribution profile.

Yet another object of the invention is to provide a sensing rotor for a flowmeter with which various degrees of negative and positive feedback can be achieved.

Another object of the invention is to provide a sensing rotor for a turbine type flowmeter wherein nozzles are pivotally and resiliently mounted in a through-flow area of a disc in such a manner that the deflection of the nozzles under the combined flow momentum and disc rotational effect is a function of the mass flow rate.

These and other more specific objects will appear upon reading the following specification and claims and upon considering in connection therewith the attached drawings to which they relate.

Briefly stated, the present invention covers a new concept of rotors for turbine type flowmeters which are not based on the turbine blade principle. The sensing rotor and a slave rotor are in the form of discs having a number of circular rows of orifices arranged around their axes of rotation. The orifices of each row are normally, but not necessarily, located an equal distance from the center of the axis and form an angle of attack with the axial direction of flow which may be any angle from 5° to 45°. The orifices may also comprise short lengths of pipe which are pivotally and resiliently mounted through the rotor. The purpose of the orifices is to allow the passage of fluids from upstream to downstream through the rotor disc and since the fluid flows along the axial direction and through the orifices at an angle with the direction of flow will create a torque which causes the rotor to rotate at an angular speed which is a function of the flow velocity.

A number of circular rows of orifices can be arranged, depending on the requirement for pressure drop, thrust bearing load, transient response, etc. For any given row, the angles of attack of all orifices with respect to the axial direction, or with respect to the entrance surface of the rotor are the same. The angles of attack for different rows may be different from each other and may be arranged according to a predetermined mathematical relationship, such as the tangent function, with a maximum angle at the periphery and zero angle at the center. The size and depth of the orifices for different rows need not be the same and, when the orifices are fixed, the rotor may be used to sense volumetric flow. When nozzles are mounted pivotally and resiliently in the through flow area of the disc, the deflection of springs which resiliently hold the nozzles under the combined flow momentum and disc rotational effects is a function of the mass flow rate of fluid flowing therethrough.

Referring now to the drawings in which presently preferred embodiments of the invention are illustrated:

FIGURE 7 is a perspective view, partially in cross-section, of a flowmeter of the invention employing a sensing rotor having stationary orifices, a decoupling means, and a slave rotor having stationary orifices;

FIGURE 8 is a longitudinal, cross-sectional view of the flowmeter of FIGURE 7;

FIGURE 9 is a cross-sectional view, partially in elevation, of a detail of construction of a rotor employing modified orifice means;

FIGURE 10 is a cross-sectional view taken along line 10—10 of FIGURE 9;

FIGURE 11 is a view on an enlarged scale showing detatils of construction of the portion of the flowmeter of FIGURE 8 enclosed within circle 11;

FIGURE 12 is a cross-sectional view, partially in elevation of another modified orifice means; and FIGURE 13 is a cross-sectional view taken along line 13—13 of FIGURE 12.

Figure 1:
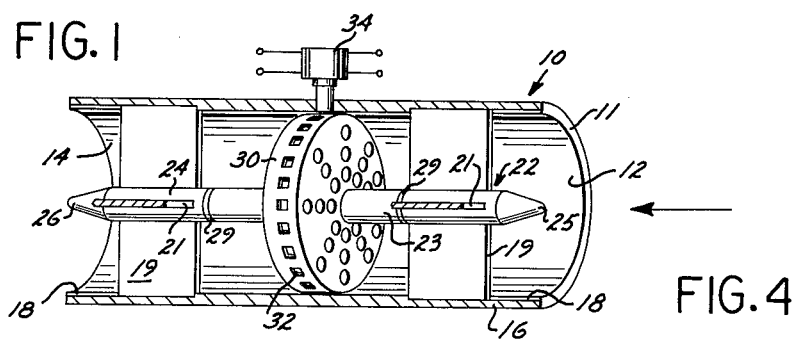
FIGURE 1 is a perspective view, partially in cross-section, of a flow meter of the invention employing a sensing rotor having fixed orifices.
Figure 2:
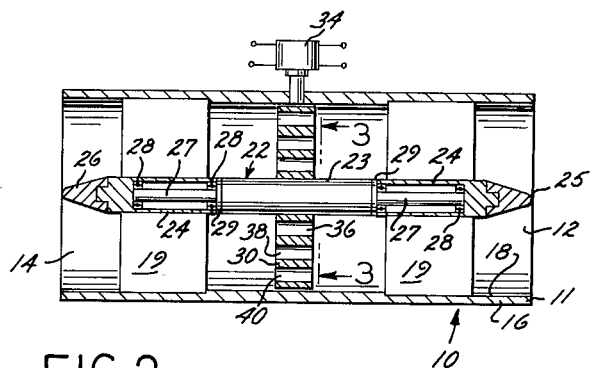
FIGURE 2 is a longitudinal, cross-sectional view of the flowmeter of FIGURE 1.
Figure 3:
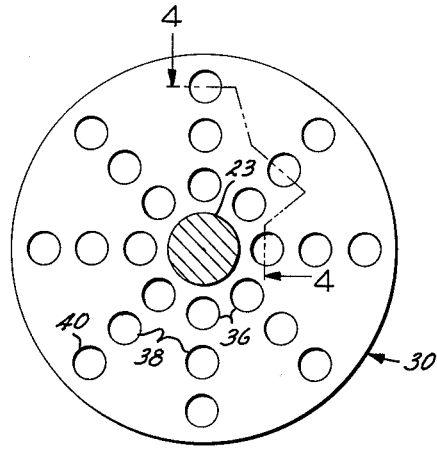
FIGURE 3 is a side elevational view, on an enlarged scale, of one form of rotor employed in the flowmeter of the invention taken in the direction of arrows 3—3 of FIGURE 2.

Referring again to the drawings and particularly to FIGURES 1-3, the flowmeter constituting one embodiment of the present invention, generally designated 10, includes a housing 11 having an inlet section 12 and an outlet section 14. The housing 11 includes an encompassing sidewall 16 having longitudinal slots 18 spaced about the inner periphery thereof at the inlet section 12 and the outlet section 14. A plurality of vanes 19 each have one end engaging a slot 18 and another end engaging a slot 21 mounted in a shaft 22 in such a manner that the shaft 22 is supported longitudinally within the housing 11.

The shaft 22 includes a solid central section 23, bored end sections 24, a nose cone 25, and a tail cone 26. A spindle 27 is rigidly affixed to each end of the solid central section 23 and each spindle is journaled in ball bearings 28 which are mounted in the bores of end sections 24. Thrust bearings 29 may be mounted on each end section 24 adjacent the solid shaft 23.

A disc shaped sensing rotor 30 frictionally engages the solid section 23 of the shaft 22 in such a manner that torque applied to the rotor 30 will cause the portion 23 to rotate. A plurality of cavities or recesses 32 are uniformly spaced about the periphery of the rotor 30 and generate pulses which are sensed by a conventional cryotronic pickup 34 which is mounted in the sidewall 16 of housing 11. The cryotronic pickup employs a high frequency electro-magnetic field to detect the passage of cavities 32 in its field. By arranging a large number of recesses 32 about the periphery of the rotor 30, a large number of pulses are generated which are used to indicate the flow rate.

Referring now to FIGURES 3–6, the rotor 30 comprises a circular disc which is shown as having a uniform thickness throughout for purposes of illustration but not of limitation. First, second and third rows of orifices 36, 38 and 40, respectively, are arranged around the axis of rotation of the rotor 30. The orifices of each row are generally, but not necessarily, located an equal distance from the center of the axis and are drilled to form a pre-determined angle of attack with the axial direction of flow of fluid flowing through the housing 11. The angle of attack is the angle subtended between the axis of the orifices and a radial plane normal to the plane of the rotor passing through the longitudinal axis thereof. While three circular rows of orifices are shown for purposes of illustration, it will be apparent to those skilled in the art that the number of rows employed depends on the requirements for pressure drop, thrust bearing load, transient response and other factors.

Figure 4:
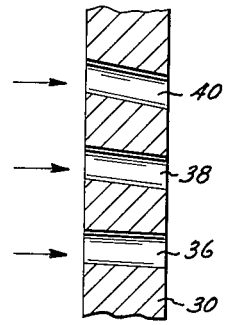
FIGURE 4 is a partial cross-sectional view on an enlarged scale taken along line 4—4 of FIGURE 3.
Figures 5, 6:
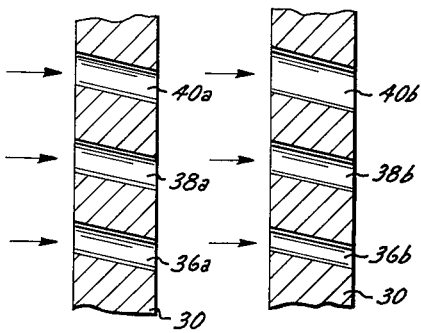
FIGURE 5 is a view similar to FIGURE 4 showing a different arrangement of orifices in the rotor shown in FIGURE 3.
FIGURE 6 is a view similar to FIGURE 4 showing yet another arrangement of orifices in the rotor of FIGURE 3.

Referring now to FIGURE 4, it is to be noted that the angles of attack differ from row to row with the maximum angle at the periphery of the rotor 30 in row 40 and zero at the center in row 36. Referring to FIGURES 5 and 6, the orifices of rows 36a, 38a and 40a, are of uniform size in FIGURE 5 while in FIGURE 6 the orifices of row 36b are of a minimum diameter, those of 38b of a second diameter and those of 40b of a maximum diameter.

Referring now to FIGURES 7–8 and 11, a flowmeter constituting a second embodiment of the present invention, generally designated 50, includes a housing 51 having an inlet section 52, an outlet section 53 and a decoupling section 54. Vanes 19 are employed to support a shaft 58 in the same manner as the vanes 19 of FIGURE 1. A rotor 30 and a cryotronic pickup unit 34, which may be identical with those shown in FIGURE 1, are also employed and will not be further described. The flowmeter 50 differs from the flowmeter 10 shown in FIGURE 1 in that it employs, in addition to the rotor 30, a slave rotor 60 which rotates a shaft about which the sensing rotor 30 revolves. When subjected to fluid flow, the rotors 30 and 60 revolve in the same direction and have approximately the same speed. As a result, the sensing rotor 30 rotates with maximum freedom at a speed governed only by the flow velocity of fluid flowing through the meter 50. The slave rotor 60 employs the same arrangement of orifices as the sensing rotor 30 and is rigidly affixed to the solid portion 62 of shaft 58. The solid portion 62 carries spindles 64 and 65 which are journaled in ball bearings 66 mounted in the bored end sections 67 of shaft 58. The end sections 67 are fixed in position by means of the vanes 19. The sensing rotor 30 frictionally engages a cylindrical sleeve 68 which is rotatably mounted by means of ball bearings 69 on the spindle 65. A set of thrust bearings 70 is employed at each of the sleeves 68. A thrust bearing 71 is also employed between the solid section 62 and the section 67 downstream of rotor 60. A decoupler 72 is mounted in the decoupling section 54 intermediate the rotors 30 and 60 to remove swirl from the flow leaving the sensing rotor 30. The pattern of the flow profile in the region of the sensing rotor 30 is kept essentially constant by the centrifugal effect of the slave rotor 60 at various flow rates. This centrifugal effect constantly readjusts the axial velocity distribution along the radial direction thus maintaining a more uniform profile pattern. The decoupler 72 includes vanes 73 having one end mounted in slots 74 in housing 51 and their other ends mounted in slots 75 in a hub portion 76 which, in turn, encompasses the shaft 58 in spaced relationship therewith.

Referring now to FIGURES 9 and 10, the rows of orifices 36, 38 and 40 shown in FIGURE 3 may be replaced with openings 79 which have nozzles or pipes 80 pivotally mounted therein by means of pins 81 and which may be arranged in any suitable manner, such as shown in FIGURES 4, 5 or 6. The nozzles 80 are spring loaded by means of a plurality of springs 83 in such a manner that the deflection of the springs under combined flow momentum and rotational effect of the rotor 30a is a function of the mass flow rate.

Referring now to FIGURES 12 and 13, the pins 81 of FIGURE 9 are not used and pipes 80a are completely suspended within openings 79a of a rotor 30b by means of a plurality of springs 83a which are connected to both the upstream and downstream ends of the pipes 80a. The openings 79a may also be arranged in any suitable manner, such as shown in FIGURES 4, 5 and 6.

The pickup 34 comprises a proximity pickup of the type in which a high frequency field is radiated about the transducer and disturbance of this field by the imposition of an anomaly will generate a pulse which can be processed via conventional pulse circuitry. The angles which the pipes 80 or 80a assume with respect to the radial plane perpendicular to the rotor and passing through the longitudinal axis of the passageway, will vary while the angles of the openings 79 or 79a are fixed. The fluid movement through the pipes will exert a rotational torque on the pipes which is a function of the fluid momentum. The generation of the torque results in a different angle of attack for the fixed passages in the rotor and for the pivoted pipes and each would prefer to rotate it at different speeds. However, since the passages 79 and 79a are fixed with the rotor 30 or 30a, the pipes 80 or 80a are deflected in order to adjust themselves to the dominant rotating speed of the rotor. Since this deflection is restrained by the springs, the resultant deflection is a function of the stream momentum. Also, since the pipes 80 or 80a are movable with the disc or rotor, the angle of deflection is subject to forces resulting also from rotation of the disc and independent of fluid momentum.

While the particular flowmeters herein shown and described in detail are fully capable of obtaining the objects and providing the advantages hereinbefore stated, it is to be understood that they are merely illustrative of the presently preferred embodiments of the invention and that no limitations are intended to the details of construction or design herein shown other than as defined in the appended claims.

What is claimed is:
1. A flowmeter comprising:
   a fluid conduit;
   a measuring rotor in the form of a disc supported within said conduit for rotation about the longitudinal axis of said conduit;
   said rotor having an upstream face and a downstream face;
   passageway means extending through said rotor and through which fluid flows from upstream face to said downstream face;
   said passageway means being of uniform size along the length thereof and being angularly positioned within said rotor in such a manner that fluid flowing therethrough imparts a rotational torque to said rotor which rotates said rotor at a speed proportional to the rate of fluid flow; and means for measuring the rotational speed of said rotor to obtain a measure of fluid flow rate through said conduit;

said passageway means comprising a plurality of separate passageways extending through said rotor at different distances from the axis of said rotor; the farther the passageway from said rotor axis, the greater the angle of attack of the passage with the axial direction of fluid flow thereby providing minimum disturbance of the fluid.

2. A flowmeter as defined in claim 1 wherein all of said passageways are cylindrical in shape and have the same cross section area.

3. A flowmeter as defined in claim 2 wherein said passageways are arranged in a plurality of circular rows concentric with said rotor axis.

References Cited by the Examiner
UNITED STATES PATENTS

| | | | |
|---|---|---|---|
| 867,419 | 10/07 | Rollin | 253—39 X |
| 1,108,497 | 8/14 | Gridley | 253—164 |
| 2,418,829 | 4/47 | Gibbs. | |
| 2,623,389 | 12/52 | Van Oosterom | 73—231 |
| 2,630,529 | 3/53 | Mann et al. | 324—70 |
| 2,841,362 | 7/58 | Yeomans | 253—39 X |
| 3,043,143 | 7/62 | Hollmann | 73—231 |
| 3,101,615 | 8/63 | Pavone | 73—231 |
| 3,135,116 | 6/64 | Kwong et al. | 73—231 |

RICHARD C. QUEISSER, *Primary Examiner.*
DAVID SCHONBERG, *Examiner.*